United States Patent [19]
Henrichsen

[11] 3,766,778
[45] Oct. 23, 1973

[54] METHOD AND MEANS FOR ANALYZING BARRELS AND AMMUNITION ON THE BASIS OF BUCKSHOT SCATTER

[76] Inventor: Ernst Henrichsen, Heide 21, 5841 Holzen, Germany

[22] Filed: Nov. 21, 1972

[21] Appl. No.: 308,432

[30] Foreign Application Priority Data
Nov. 22, 1971 Germany.................. P 21 57 795.7
Sept. 14, 1972 Germany.................. P 22 45 013.1

[52] U.S. Cl.................................. 73/167, 250/234
[51] Int. Cl................................................ G01l 5/14
[58] Field of Search................. 73/167; 250/234; 235/92 PC, 98 C

[56] References Cited
UNITED STATES PATENTS
| | | | |
|---|---|---|---|
| 197,398 | 11/1877 | O'Neil.................................. | 73/167 |
| 2,122,710 | 7/1938 | Bidwell et al..................... | 235/98 C |

Primary Examiner—Donald O. Woodiel
Attorney—David Toren et al.

[57] ABSTRACT

The number and distribution of hits by buckshot pellets on a test area are analyzed by moving the test area relative to a sensor that covers a zone smaller than the area and approximates the size of a typical target such as a clay pigeon. The sensor produces a test signal each time it senses a penetration of the test area due to a hit. An oscillator produces timing signals. A counter counts the number of coincidences of timing signals with test signals. A divider compares the total number of timing signals with the number of coincidences for predetermined time periods. Each time period represents a region of the test area covered by the sensor. According to one embodiment, the sensor covers successive annular regions of the test area. According to another embodiment, the sensor travels along parallel lines and then along other parallel lines transverse to the first parallel lines.

17 Claims, 6 Drawing Figures

METHOD AND MEANS FOR ANALYZING BARRELS AND AMMUNITION ON THE BASIS OF BUCKSHOT SCATTER

BACKGROUND OF THE INVENTION

This invention relates to a process for investigating the scatter of pellets in buckshot for the purpose of assessing gun barrels, the associated ammunition, or both, by means of test targets which are shot at, and to devices for carrying out this process.

When a hunting or sporting shotgun is fired, the shotgun pellets which leave the gun barrel and strike a flat target are scattered over an approximately circular area around the center of the target. In judging such a shotgun, the extent of scattering and the uniformity with which pellets are distributed, are significant. A rough test can be carried out by drawing a circle of a specific diameter, preferably 75 cm, on a test target, shooting at the latter from a definite distance (standardized at 35m), and then counting how many pellets have hit within the circle. This number, expressed as a ratio to the total number of pellets in the cartridge, indicates the hitting performance as a percentage. However, this value only states in essence whether the weapon is better suited for close-range or long-range shooting, but says nothing about the uniformity with which the pellets are distributed in the circle in which hits are made.

An object of this invention is to improve such buckshot scatter testing methods and means.

Another object is to predict buckshot scattering, of various gun barrels and ammunition, more accurately.

Another object of the invention is to test the uniformity of the distribution of buckshot pellets using fewer personnel in a shorter time than heretofore necessary.

SUMMARY OF THE INVENTION

According to the invention, there is provided a method of sensing or indicating the scatter of pellets in buckshot for the purpose of assessing gun barrels or the associated ammunition or both by confirming and counting the pellet penetrations in targets which have been shot at. A sensing area is moved at constant speed and in accordance with a predetermined pattern over the whole test target to be evaluated. At predetermined regular measuring intervals a determination is made whether a pellet has penetrated the region of the target which at the moment is covered by the sensing area.

The sensing area can comprise or simulate magnitudes which frequently occur in practice, for example the magnitude of projection of an object aimed at, such as a clay pigeon. Thus, according to another feature of the present method, the number of positively confirmed pellet penetrations is compared with the total number of confirmations carried out in order that test results may then be made in percentages regarding the number of hits or misses of definite gun barrels or the associated ammunition or both. It is presumed that in clay-pigeon shooting it is sufficient to find out whether at least one pellet has penetrated each region of the target corresponding to the size of a clay pigeon, since such penetration attains the desired object, namely the destruction of the clay pigeon. It is quite clear that other sensing area magnitudes may be chosen in dependence on the definition of other criteria of assessment.

In the case of circular targets, it is particularly advantageous to move the sensing area spirally round the center of the target, and to have an indication given for a definite annular region of the target after the sensing area has performed a definite number of revolutions.

In this connection, only the ratio of positive conformed penetrations in definite segments of the annular regions to the total number of measurements in these segments may be indicated in each case, so that an indication for definite annular-segment fields is given. In this way, no limits are set to the precision with which the whole test target may be subdivided, and the scatter of a buckshot may thus be stated or assessed as precisely as may be desired.

Before starting the test target running spirally as mentioned above, it is expedient to determine, as accurately as possible, the center of the dispersion pattern drawn on the test target by pellet penetrations, in order then to rotate the test target about this center. One possible procedure for doing this is to place a transparent target bearing concentric rings on the test target which has been shot at, and to displace the transparent target until the center appears to have been found. This center is then marked by a hole at the center of the transparent target. This procedure is however liable to subjective errors since different persons can come to differing conclusions regarding the center of the dispersion pattern on the test target. For other reasons, it is desirable to be able to define the exact center of a shot dispersion pattern formed by the pellet penetrations, in fact in order to find out to what extent such a center coincides with the centering point of a test target which was really sighted.

According to another feature of the present invention the center of a shot dispersion pattern drawn on a test target by pellet penetrations may be determined exactly without subjective errors by moving the sensing area over the penetrated region of the target along parallel lines in one direction and then along parallel lines in a direction transverse to the one direction. Positively confirmed penetrations made at regular intervals are added after each line or group of lines has been traversed. In each of the two mutually perpendicular directions there may be determined from these lines, or from strip-sums formed from a plurality of lines, the point in relation to which there is an equal number of positively confirmed penetrations on both sides. The intersection point then is defined from the two straight lines extending through these points parallel to the mutually perpendicular lines. In this connection, only the sums of lines or strips need be worked out, retained and progressively added, the end result divided by two, and a search then is made to find out on which line or strip this value is approximately reached. The center line may then be determined by interpolation with any desired degree of accuracy.

According to a feature of the invention, there is provided a device for carrying out the method, the device comprising means for rotating a test target, a sensing device movable radially of the target at constant speed and forming a sensing area, and an oscillator for defining the measuring intervals.

According to a further feature of the invention, there is provided a device for carrying out the method, the device comprising a sensing device movable rectilinearly to and fro at uniform speed, means for moving the target at the end of each to or fro movement of the sensing device by one line spacing perpendicularly to the movement of said sensing device the sensing device providing said sensing area and an oscillator for defining the measuring intervals.

In the latter case, it is advisable for the size of the sensing area to correspond to, or to be smaller than, the size of a pellet penetration, since this results in a correct picture regarding the true position of the center referred to the total area formed by all the pellet penetrations.

A larger sensing area may naturally also be used, for example again one corresponding to an aimed-at object such as a clay pigeon, but then a kind of effective center of a shot dispersion pattern would be obtained, since then the essential factor would not be the real total area formed by all the pellet penetrations, but merely whether or not an effective hit has been obtained in each instantaneous sensing area region of the target. In other words, this means that the search for a definite center depends on how this center of a shot dispersion pattern is defined.

In the case of both devices hereinbefore described the sensing area may be provided by an aperture for receiving light from a light source disposed on a side of the target opposite that of a light sensitive element, the element receiving light when a target penetration coincides with said aperture.

According to an embodiment of the invention a lens system is arranged between the aperture and the light-indicating element in order to collect the light rays passing through the aperture.

The various measurements may be counted, compared and indicated in simple fashion with the electronic means which are nowadays available.

According to an embodiment of the invention the test results are indicated digitally by means of suitable equipment. According to another embodiment they are displayed in analog fashion. The latter offers the advantage that any errors which appear are indicated particularly clearly.

Finally, it is furthermore also possible to provide a plurality of sensing devices for simultaneously sensing various parts of the test target in order correspondingly to shorten the time required for evaluation.

These and other features of the invention are pointed out in the claims forming part of this specification. Other objects and advantages of the invention will become evident from the following detailed description when read in light of the accompanying drawing. While the description discloses details of embodiments of the invention, it will be obvious to those skilled in the art that the invention may be embodied otherwise without departing from its spirit and scope.

DESCRIPTION OF PREFERRED EMBODIMENTS

Figure 1:
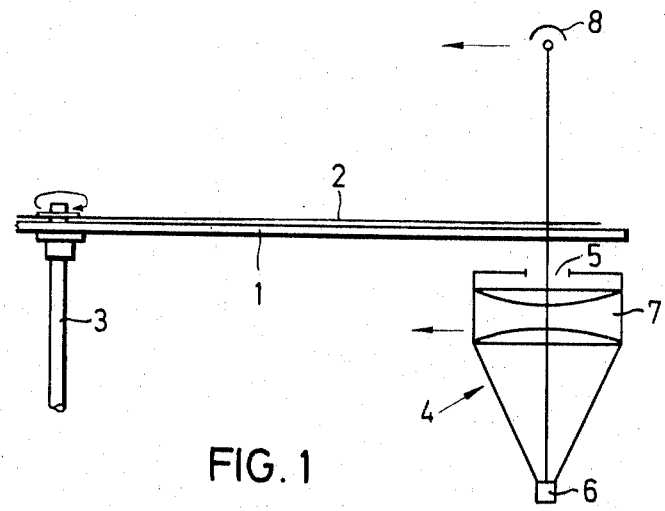
FIG. 1 is a diagrammatic side elevation showing a device embodying features of the invention for carrying out a method of the invention.

The device according to FIG. 1 serves to move a test target spirally, and comprises a rotating target 1 of transparent material, such as Plexiglas, driven at uniform speed. A test target 2 to be shot at, made of material impermeable to light, for example black paper, metallized paper or metal foil, is clamped to said rotating target.

The longitudinal axis of an optical sensing device 4 extends parallel to a shaft 3 of the rotating target. The sensing device 4 includes an aperture 5 serving as a sensing area and a light-sensitive element 6, such as a photo-transistor. An optical system 7 collects the light rays passing through the aperture 5 and directs them on to the light-sensitive element 6. The size of the aperture 5 corresponds to the size of a clay pigeon of about 45 cm$^2$.

On the other side of the rotating target 1 and the test target 2, a light source 8 is aligned with the aperture 5, and the whole sensing device 4 including the light source 8 is, as indicated by the arrows, movable in a direction radially of the rotary targets 1 and 2 at a predetermined speed.

It will be appreciated that this arrangement enables a light ray to pass from the light source 8 via the aperture 5 and the optical system 7 to the light-sensitive element 6 when at least one perforation has been made by a pellet in the region of the test target 2 which happens to be in front of the aperture 5.

Figure 2:
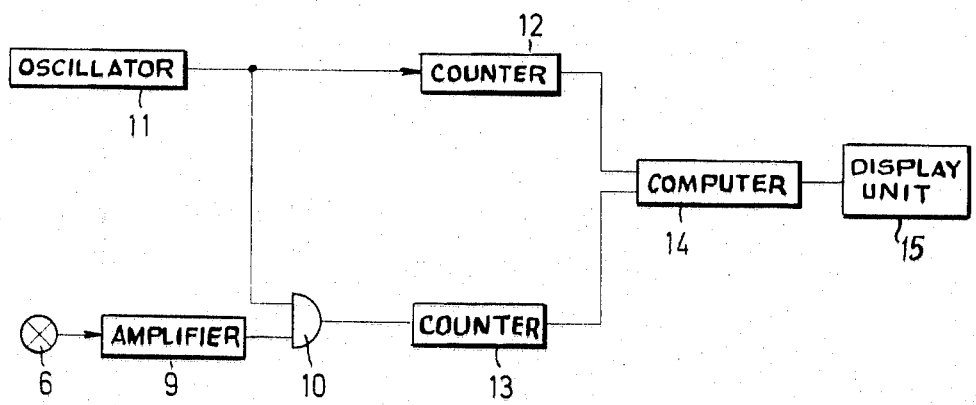
FIG. 2 shows a circuit arrangement of the device of FIG. 1 for counting annular surfaces.

FIG. 2 illustrates a circuit arrangement by means of which measurements carried out at definite time intervals can be counted, compared and indicated. The light-sensitive element 6 is connected via an amplifier 9 to a so-called AND gate 10, to which an oscillator 11 is also connected. The oscillator 11 is connected directly to a counter 12, and via the AND gate 10 to another counter 13. Both counters 12 and 13 are connected to a computer 14, and the latter to an indicator or display unit 15.

Pulses from the oscillator 11 define measuring intervals. A signal is issued by the light-sensitive element 6, when there is at least one perforation in the region of the test disc or target 2 disposed opposite to the aperture 5. The counter 13 counts the number of oscillator pulses which occur during one signal from the element 6. The computer 14 divides the count of counter 13 by the total number of pulses counted in the counter 12. The computer becomes especially simple if this total number is a power of ten, which can be achieved by suitable choice of oscillator frequency. The number indicated in the display unit 15 shows the proportion of the target test area which has been hit at least once in relation to all the test target area whose midpoint lies on the measuring surface. Reading off at definite intervals then enables an indication regarding an annular field to be obtained each time.

Figure 3:
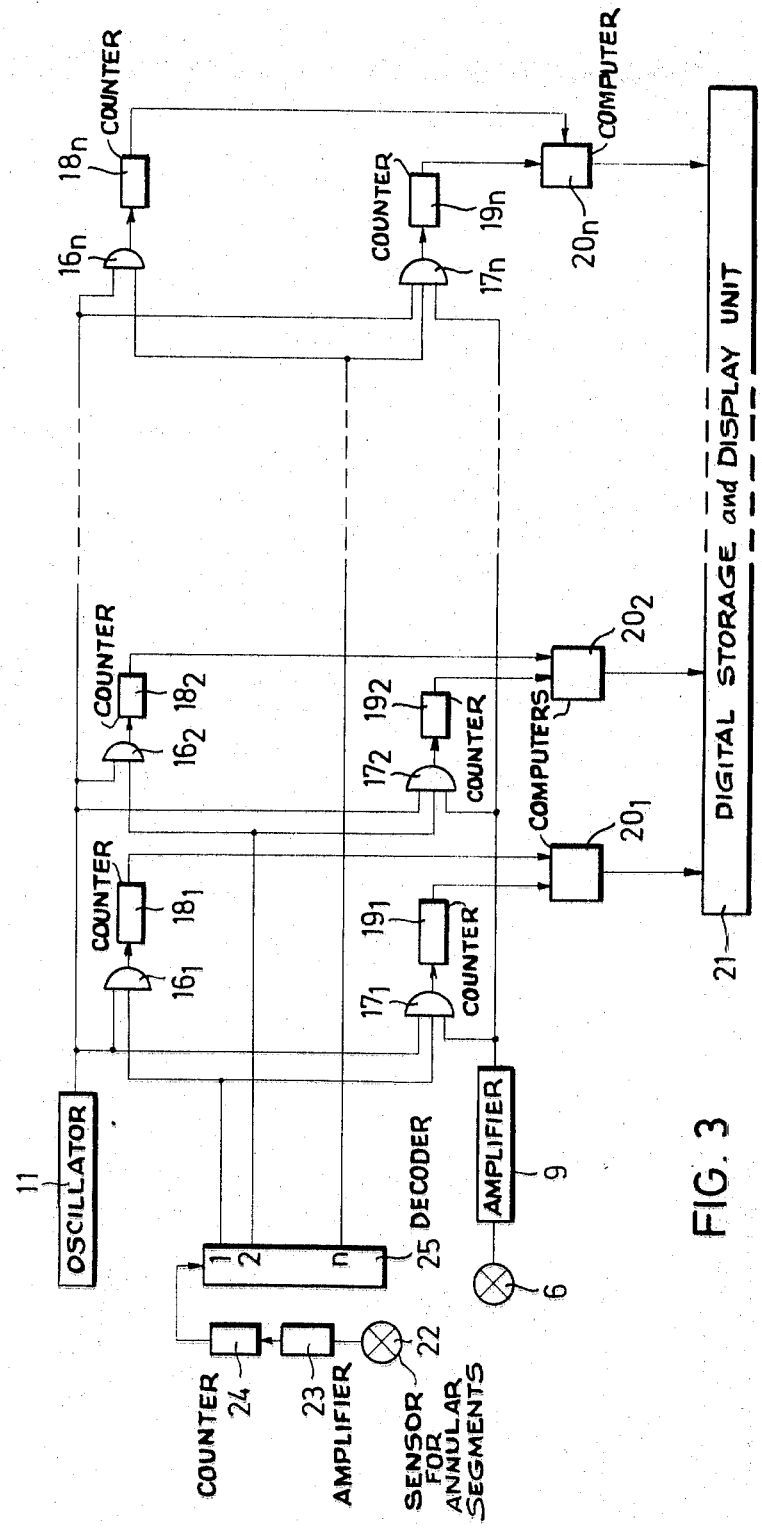
FIG. 3 shows a circuit arrangement of the device of FIG. 1 for counting annular-segment surfaces

FIG. 3 represents a circuit arrangement by means of which indications regarding the ratios in the annular segment fields may be obtained. In this case, the light sensitive element 6 is again connected via an amplifier 9 to a number of AND gates $17_1$, $17_2$ etc., to which the oscillator 11 is also connected.

The oscillator 11 is furthermore connected to a series of further AND gates $16_1$, $16_2$, etc. Each AND gate is connected via a counter $18_1$, $18_2$ etc. or $19_1$, $19_2$ etc. to a computer $20_1$, $20_2$ etc., and all the computers are connected to a combined storage mechanism and display unit 21, which latter may for example be made in the form of a printer.

Marks which trip actuations or pulses for an electrical sensor 22 are made on the rotating target 1 to correspond to the number of annular-segment fields desired, and these pulses are fed via an amplifier 23 and a counting mechanism 24 to a decoder 25, which latter is connected to all the AND gates $16_1$, $16_2$ etc. and $17_1$, $17_2$ etc.

The circuit works in the following manner:

The sensor 22 senses the first mark on the rotating target and sets the counting mechanism 24 to "1." As a result, the two AND gates $16_1$ and $17_1$ are opened, and the pulses emanating from the oscillator 11 are counted in the two counting mechanisms $18_1$ and $19_1$.

When the next mark on the rotating target reaches the sensor 22, the latter delivers a further pulse to the counting mechanism 24, so that the latter switches to a "2" with the result that the AND gates $16_1$ and $17_1$ are closed and the AND gates $16_2$ and $17_2$ are opened, so that the pulses from the oscillator 11 are now counted in the counting mechanisms $18_2$ and $19_2$. Matters continue thus up to the nth counting mechanism. After the nth mark, or after the $n$th sector, it is again the turn of the first sector, and then a further count takes place in the counting mechanism $18_1$ and $19_1$. This is repeated until all the sectors of a ring of a definite width have been counted. Between two oscillator pulses, the counting mechanism are interrogated and set to "0," and the quotient is formed in the computer $20_1$, $20_2$ etc. in each case and placed in store in the store 21. Counting of the sectors in the following ring can then begin with appearance of the next oscillator pulse. At the same time, the stored values of the first ring can be printed out, for example by a digital printer.

A device suitable for determining the center of a shot dispersion pattern differs from the device reproduced in FIG. 1 merely in that here the target 1 which carries the test target 2 is not made rotatable, but movable perpendicular to the plane of the drawing intermittently or line-by-line. The sensing device 4 is then moved rectilinearly to and fro in the plane of the paper at uniform speed over the entire width of the area thus enabling the target to be scanned in a series of parallel lines. The light-sensitive element 6 is then again connected to conventional electronic means, not illustrated, which add the positively confirmed measurements upon starting on at least one line or upon starting on a strip made up of a plurality of lines. The end result of all the sums of lines or strips is then likewise added electronically and divided by two, and then a search is made for the strip or line in which half the total sum of all positively confirmed measurements lies. A center line is drawn through this line or strip, and then the test target is rotated through 90° with respect to the clamping target, whereupon the test target is again started and sensed in the manner previously described and the second center line is drawn, the point at which said second center line intersects with the first center line being the center of the shot dispersion pattern referred to the total area formed by all the pellet penetrations.

The examples of embodiment described can naturally be modified in many ways without departing from the scope or the invention as defined by the appended claims. Thus for example the optical sensing device may be replaced by electro-mechanical sensing in which the target 1 is made of metal and constitutes one pole of the receiving system. The second pole is then formed by a metal brush of the same size as the simulation field, one bristle of the brush coming into contact with the metal target 1 each time a perforation is present in the test target, and tripping a current. This current may then be evaluated via an oscillator, exactly as in the case of the optical sensing device previously described. Test targets to be evaluated may naturally also be started in accordance with patterns other than those previously described, according to how the test criteria are defined in each case. The relative movement between the test target and the sensing device may also be carried out in ways other than those described. For example, in the case of sensing in the form of lines, a continually stationary test target and sensing device moving both to and fro in line fashion and perpendicularly thereto from line to line may be used. As already mentioned hereinbefore, the size of the sensing area may be chosen as desired in accordance with the test criteria defined in any particular case, as also may be the duration of the measuring intervals and thus the amount by which the target regions sensed by the sensing areas overlap in any particular case, in order that test results regarding scatter may be made in any desired form and manner, more particularly with any desired degree of accuracy.

Figure 4:
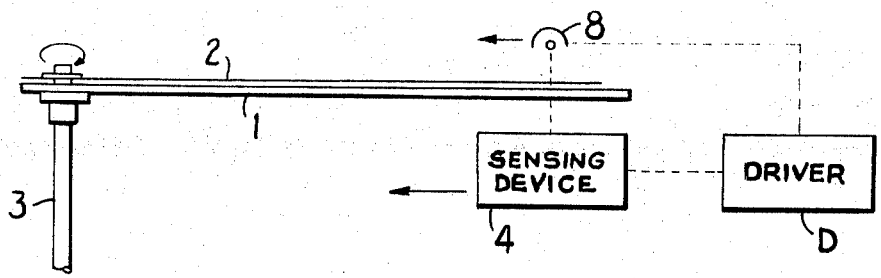
FIG. 4 is a diagrammatic side elevation showing an embodiment of the invention.

FIG. 4 illustrates an embodiment showing the manner in which the sensing device 4 including light source 8 moves radially relative to the targets 1 and 2. Here a driver D provides radial motive power. According to one embodiment of the invention, the driver D moves the sensing device 4, including the light source 8, at a constant predetermined speed. According to another embodiment of the invention the driver D moves the sensing device 4 intermittently. Each time the targets 1 and 2 have performed one rotation, the sensing device 4 is moved radially to another position where it is held while the targets 1 and 2 rotate one revolution. At the end of that revolution the sensing device 4 is again moved radially to another position. Preferably, although not necessarily, the targets are held still while the sensing device 4 is moved between positions.

The terms "confirming," "confirmations," and "confirmed penetrations" refer to the confirmations performed by the coincidences of timing pulses from the oscillator 11 and sensed pulses from the light-sensitive element 6 and the amplifier 9.

Figure 5:
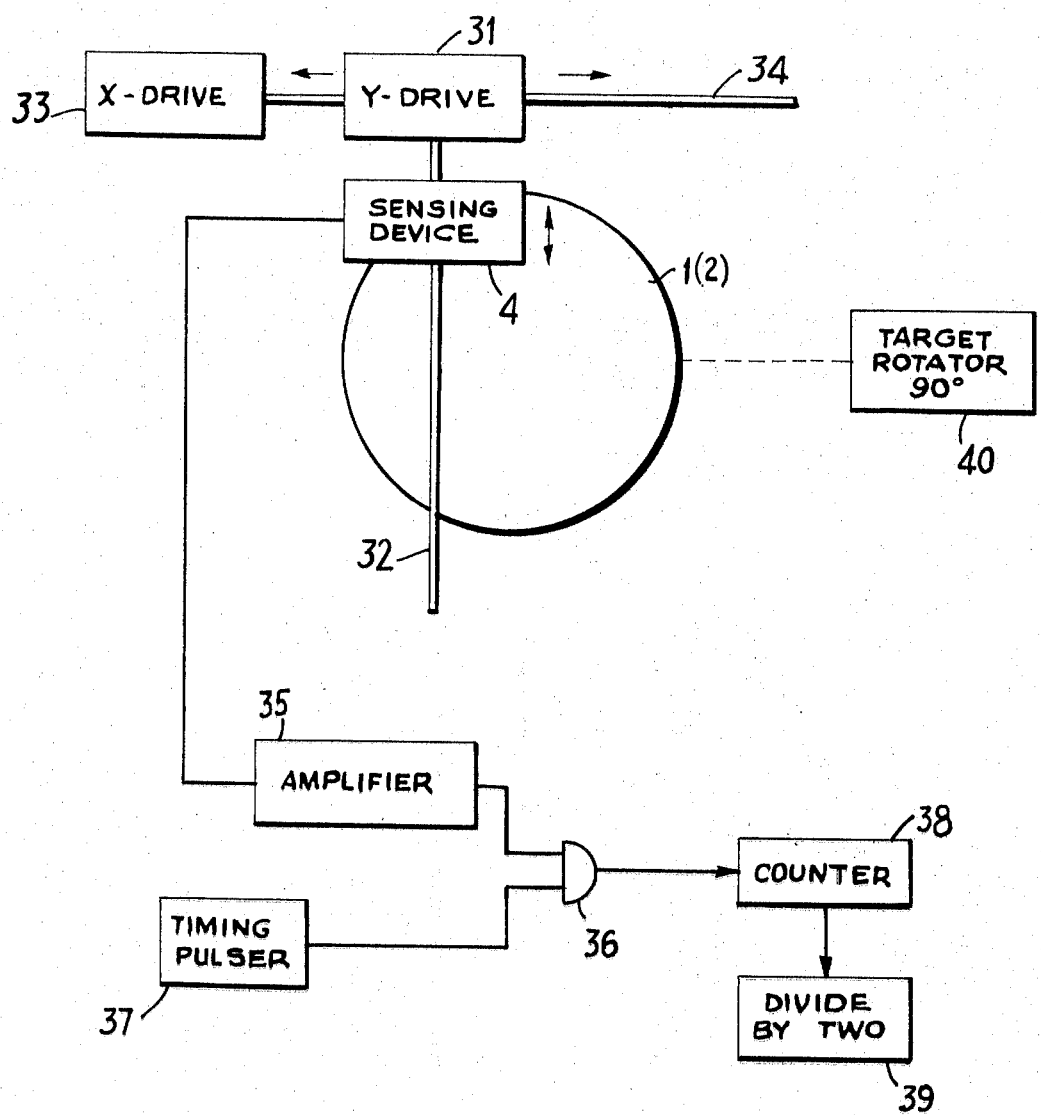
FIG. 5 shows a circuit arrangement of the device of FIG. 4.

An example of the previously mentioned apparatus for finding the center of the pellet penetrations on the target is shown in FIG. 5. Here a Y-drive 31 moves the sensing device 4 along a track 32 extending in the Y-direction. Similarly, an X-drive 33 moves the Y-drive along a track 34 in the X-direction. According to a preferred embodiment the X-drive is activated each time the Y-drive 31 has driven the sensing device 4 through one line along the track 32. The X-drive 32 then moves the Y-drive one step in the next direction to allow the Y-drive to move the sensing device 4 through one run along the Y-direction.

Each time the sensing device 4 senses the presence of a pellet perforation, it produces a pulse which an amplifier 35 applies to an AND gate 36. Coincidence of a pulse from the sensing device 4 with pulses from a timing device 37 produce an output at the AND gate 36. A counter 38 counts the pulse output of the AND gate 36. The timing pulser 37 corresponds to the oscillator 11. When the X-drive 33 and the Y-drive 31 have moved the sensing device 4 across the entire target and counted all the penetrations, the process can be started again in the reverse direction. A divide-by-two counter stores one-half of the total value originally entered in the counter 38. When this half value is reached during the run in the reverse direction the X-position of the line running through the center of the distributed penetrations will be indicated by the position of the sensing device.

To determine the position of the perpendicular line running through the center of the distribution of penetration, a target rotator 40 rotates the targets 1 and 2 90° and the procedure is repeated.

Figure 6:
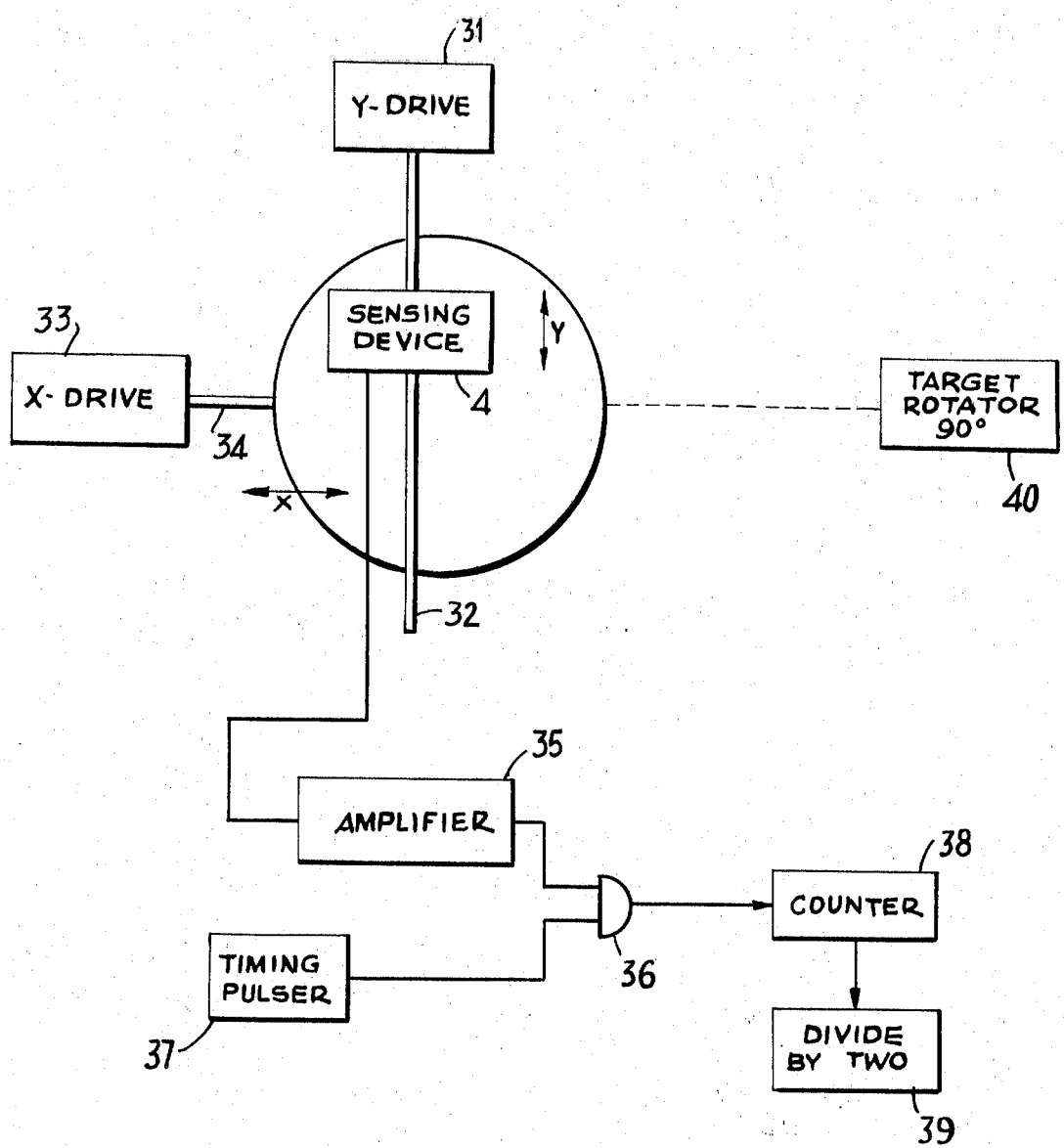
FIG. 6 shows another circuit arrangement of the device of FIG. 4.

FIG. 6 illustrates an apparatus similar to the one in FIG. 5. However, here the X-drive 33 moves the targets 1 and 2 relative to the sensing device 4 rather than moving the Y-drive 31 and the sensing device 4.

According to another embodiment of the invention, the apparatuses of FIGS. 5 and 6 may be used to assess the radial distribution of the penetrations directly. This is done by connecting the output of the sensing device 4 to a computer together with outputs from the Y-drive 31 and X-drive 33 indicating the position of the sensing device 4. The computer can be programmed to convert the rectangular coordinates of the sensing device 4 to polar coordinates and then determine the distribution of pellet penetration.

The conversion from rectangular to polar coordinates is a standard mathematical process which can be easily programmed into a computer.

What is claimed is:

1. The method of determining the quality of gun barrels and ammunition by analyzing the distribution of indications of hits produced by pellets on a test surface, which comprises moving the test surface and a sensor having a given area along a predetermined pattern relative to each other and at predetermined rates, producing a test signal whenever the sensor coincides with an indication, producing timing signals for establishing a measuring interval, and counting the number of coincidences of a timing signal with a test signal.

2. A method as in claim 1 further comprising the step of comparing the number of coincidences with the number of time signals.

3. The method as in claim 1, wherein the predetermined pattern is a spiral so that the sensor moves relative to the surface along a spiral path.

4. A method as in claim 3, further comprising the step of repetitively counting the number of coincidences for different portions of the spiral each time the sensor traverses the portion of the spiral.

5. A method as in claim 4, further comprising the step of comparing the number of coincidences with the number of timing signals for each of the portions of the spiral.

6. A method as in claim 1, further comprising the step of determining the center of the distribution of indications, said step of determining the center including moving the sensor and the surface relative to each other so that the sensor moves along parallel lines in one direction and then moves along parallel lines perpendicular to the parallel lines of the other direction, counting the number of coincidences of timing signals with test signals for each line traversed by the sensor relative to the surface, determining the line representing the midpoint of the number of coincidences in each direction so as to establish the center point from the intersection of the lines in each direction.

7. A device for determining the quality of gun barrels and ammunition by analyzing the distribution of indications produced by buckshot on a test surface, comprising a sensor near the surface, drive means for moving the sensor and the surface relative to each other along a predetermined pattern, said sensor having signal-producing means for producing a test signal whenever the sensor coincides in position with an indication, signal generator means for producing a plurality of timing signals to establish measuring intervals, counting means coupled to said sensor and said signal generator means for counting the number of coincidences of timing signals with test signals, said driving means moving said test surface and said sensor relative to each other at predetermined speeds.

8. A device as in claim 7, wherein said driving means moves said sensor along a spiral pattern.

9. A device as in claim 7, further comprising divider means for comparing the number of coincidences with the number of timing pulses over successive time periods.

10. A device as in claim 9, wherein said driving means moves said sensor along a spiral pattern.

11. A device as in claim 7, wherein said drive means includes rotating means for rotating the surface and linear drive means for moving the sensor radially relative to the surface.

12. A device as in claim 7, wherein said driving means includes linear moving means for moving the sensor and the surface relative to each other so the sensor moves along consecutive parallel paths in one direction and for moving the sensor and the surface relative to each other so said sensor traverses parallel lines transverse to the one direction.

13. A device as in claim 7, wherein said sensor includes a light source, light-sensitive means, and aperture forming means between the light sources and said light-sensitive means, the indications being in the form of perforations, said surface being positioned between said light source and said light-sensitive means.

14. A device as in claim 13, wherein said sensor includes a lens system arranged between said aperture forming means and said light-sensitive means for collecting light rays passing through the aperture forming means.

15. A device as in claim 7, further comprising a second sensor for simultaneously sensing another portion of the surface.

16. A device as in claim 7, further comprising digital means coupled to said counting means for indicating the results digitally.

17. A device as in claim 10, further comprising digital means responsive to said divider means for indicating the output of said divider means digitally.

* * * * *